J. P. TARBOX.
MACHINE FOR FORMING BLADES OF OARS.
APPLICATION FILED AUG. 27, 1907.

935,334.

Patented Sept. 28, 1909.
8 SHEETS—SHEET 1.

Witnesses
Inventor
John P. Tarbox
Attorney

J. P. TARBOX.
MACHINE FOR FORMING BLADES OF OARS.
APPLICATION FILED AUG. 27, 1907.

935,334.

Patented Sept. 28, 1909.
8 SHEETS—SHEET 2.

J. P. TARBOX.
MACHINE FOR FORMING BLADES OF OARS.
APPLICATION FILED AUG. 27, 1907.

935,334.

Patented Sept. 28, 1909.
8 SHEETS—SHEET 5.

Witnesses
W. L. Rockwell
R. H. Tucker

Inventor
John P. Tarbox
by Spencer B. Prentiss
Attorney

J. P. TARBOX.
MACHINE FOR FORMING BLADES OF OARS.
APPLICATION FILED AUG. 27, 1907.

935,334.

Patented Sept. 28, 1909.
8 SHEETS—SHEET 7.

UNITED STATES PATENT OFFICE.

JOHN P. TARBOX, OF WASHINGTON, DISTRICT OF COLUMBIA.

MACHINE FOR FORMING BLADES OF OARS.

935,334.

Specification of Letters Patent. Patented Sept. 28, 1909.

Application filed August 27, 1907. Serial No. 390,344.

*To all whom it may concern:*

Be it known that I, JOHN P. TARBOX, a citizen of the United States, residing at Washington, District of Columbia, have invented certain new and useful Improvements in Machines for Forming the Blades of Oars, of which the following is a specification.

The present invention relates to improvements in the machine described in my co-pending application Serial No. 365372. Various changes and modifications have been made to the end of bettering and cheapening the construction and simplifying the operation. The transverse carriage is done away with in the present instance and the cutters are moved toward and from the path of the work instead of the work moving laterally to the cutters. Improved means are provided to guide and hold the work and the parts are all so grouped that all thrust is taken up in a rigid rectangular frame. The mechanism for adjusting the distance between cutters for the thickness of the edge of the oar has been improved and made more readily adjustable, the shafts being mounted eccentrically in revoluble cylindrical shells, the connection between the shells being such that the whole mechanism forms a counter-balanced system, the weight on the upper cutter shaft being balanced by the weight on the lower cutter shaft.

As will be seen, the present improvements lend themselves readily to the construction of the machine that will complete an ore in one operation, all four faces (the two adjacent faces on one side and the two adjacent faces on the opposite side) being cut at the same time, whereas in the single cutter machine which forms the subject matter of my co-pending application, above referred to, two faces only are cut.

Referring to the drawings, Fig 1ª is a section through the cutter head, sleeves and collars on one side of the main shafts; Fig. 6ª is an end elevation of the rear work guiding and holding means; Fig. 6ᵇ is a central transverse section on line 6—6 of Fig. 6ª.

Figures 1, 1A, 5:
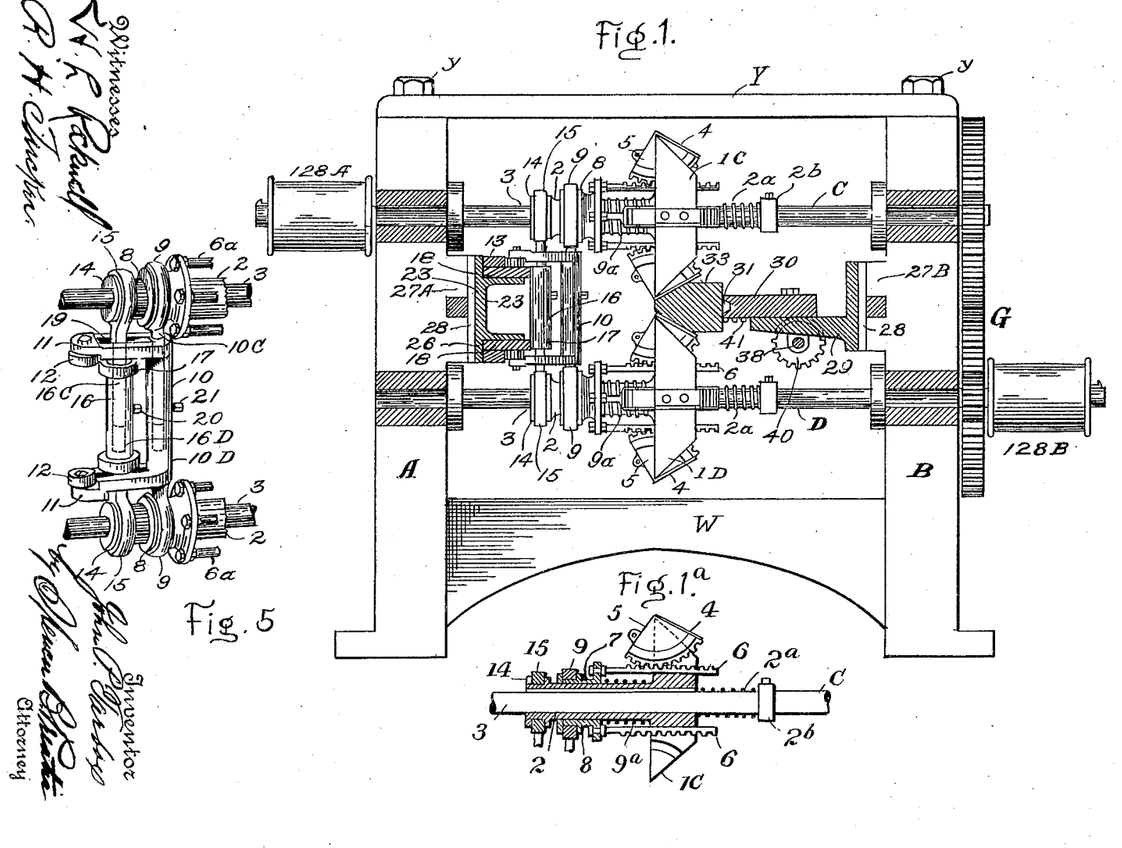
Figure 1 is a sectional elevation of the machine taken on line 1—1, of Fig. 3.
Fig. 5 is a perspective view of the mechanism for moving the cutter heads and individual knives.

In Fig. 1, A and B are the main bearing standards rising from the base of the machine, W is a web that spans them at the bottom and Y a cast iron yoke rigidly bolted to the tops by bolts $y$. The cutter shafts C and D are carried in bearings to be presently described. The shafts C and B are interlocked by means of gearing G, so that the individual knives on the top and bottom of the work strike at the same instant, the teeth of the gears G being long enough to admit small vertical movement of the shafts. The shafts carry the cutter heads 1ᶜ and 1ᴅ, having sleeves 2 formed integrally therewith and slidably splined on the respective shafts by long keys 3. These cutter heads carry the knives 4 on segments 5 revolubly mounted in the heads and geared to racks 6, which racks are in turn attached to flanged sleeves 7 on the outside of the sleeves 2, by rods 6ª. These sleeves 7 are provided with collars 8 and straps 9, the straps on the upper and lower shafts being interconnected by adjustable rods 10. Longitudinally slotted projecting arms 11 carry rollers 12 adapted to follow patterns 13. The sleeves 2 which connect with the cutter heads are also provided with collars 14 on their ends and straps 15 interconnected by rod 16, the rod carrying rollers 17 arranged to follow patterns 18 placed immediately below patterns 13, the rod 16 passing through the slots 19 in the projecting arms 11, above mentioned. This permits sleeves 7 and 2 to move relatively to each other, as well as relatively to the shafts on which they are mounted. Springs 2ª on the shafts C and D, between collars 2ᵇ and the cutter heads serve to keep the rollers 17 against the patterns 18, while springs 9ª between the cutter heads and sleeves 7 oppose the centrifugal force exerted by the weight of the segments on the sleeves 7 and keep the rollers 12 against the patterns 13. To admit vertical adjustment of the shafts, rods 10 and 16 are made adjustable, the lower part of each rod, 10ᴰ and 16ᴰ, respectively, being enlarged and provided with a central bore of such a size as to admit the ends of the upper rods 10ᶜ and 16ᶜ. This construction is clearly shown in Fig. 5. Set screws 20 and 21 are provided for fixing the rods at any dimension.

Figure 3:
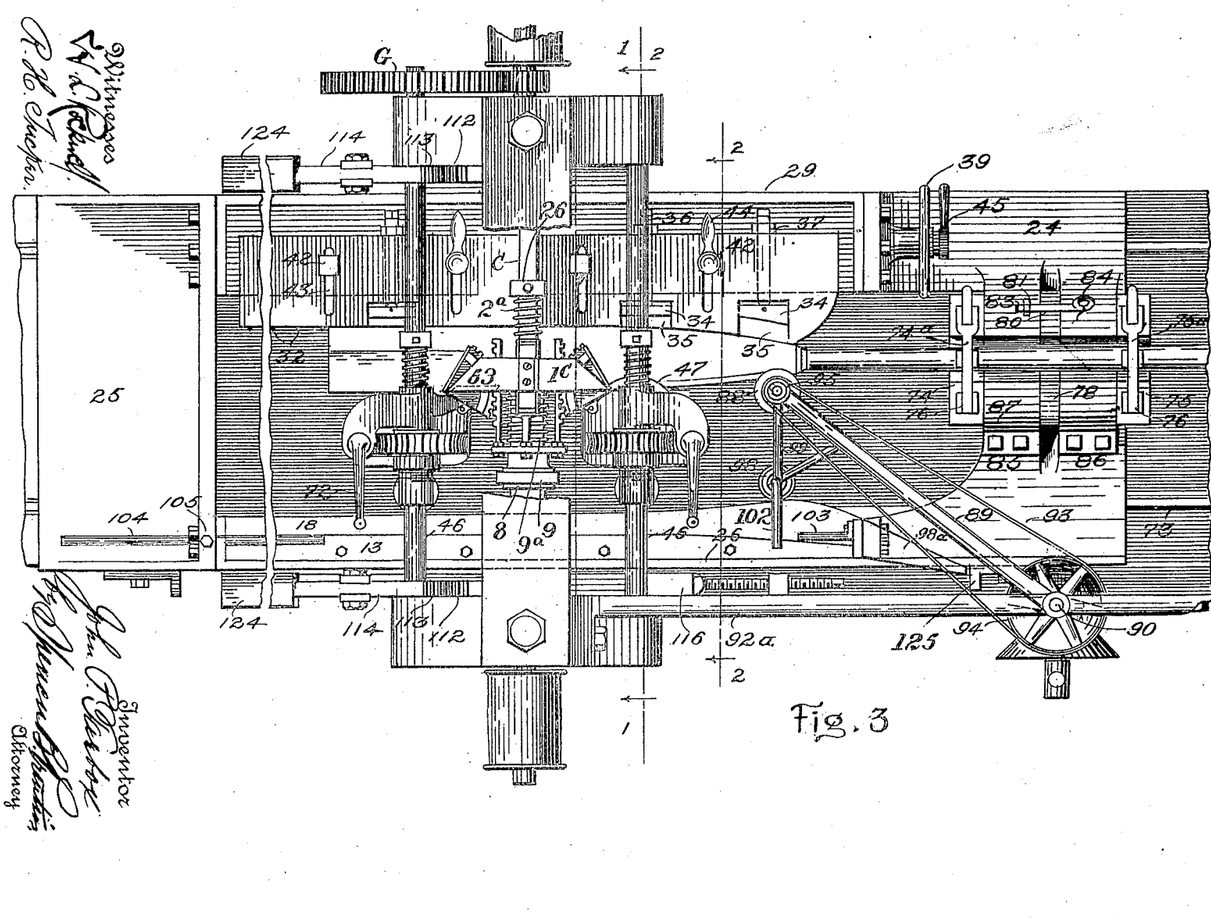
Fig. 3 is a plan view with the top yoke broken away to show the cutters.

The patterns 13 and 18 are mounted on the upper and lower sides of substantially U-shaped steel beam 23, extending from the head-stock 24 to the tail piece 25, as shown in Fig. 3. This beam is centrally located between the two shafts C and D. The upper and lower sides have longitudinally extending flanges 26 formed integral with the beam, the one side being in the same plane as the outside of the bottom of the U and the other side forming a backing for the patterns carried by the beam. The beam is smoothly machined on the side next the standard A and adapted to move in contact with the abutment 27ᴬ formed on the inside of the standard. The abutment is provided with a wearing plate 28 suitably secured in place. On the opposite side of the machine with its base backing against an abutment 27ᴮ, is an L-shaped beam 29 also extending between the head-stock and the tail piece, and carrying a steady rest 30 slidably mounted thereon. This rest has a V-shaped groove 31 in its edge and the edges of the groove are studded with pins 32 adapted to hold the edge of the rough blank 33. The V-shaped groove receives the finished edge of the oar when the work is turned, one side having been cut, abutments 34 placed at intervals in slots 35, pivotally secured to the ends of bolts 36 and provided with jam-nuts 37, serving to firmly rest the finished edge of the blade, and the side walls of the edge between the slots preventing vertical movement. A shaft 38 mounted beneath the beam 29 and provided with a hand-wheel 39 (see Fig. 3) and pinions 40, meshing with racks 41, secured to the under-side of the rest 30, is provided for adjusting the rest to and from the work. Bolts 42, passing through slots 43 in the rest, secure the same to the beam 29, and some of the bolts 42 are provided with handles 44 for clamping the rest in place. A clamping screw and handle 45 are also provided at the end of the shaft just outside of the hand-wheel 39.

Figures 2, 6:
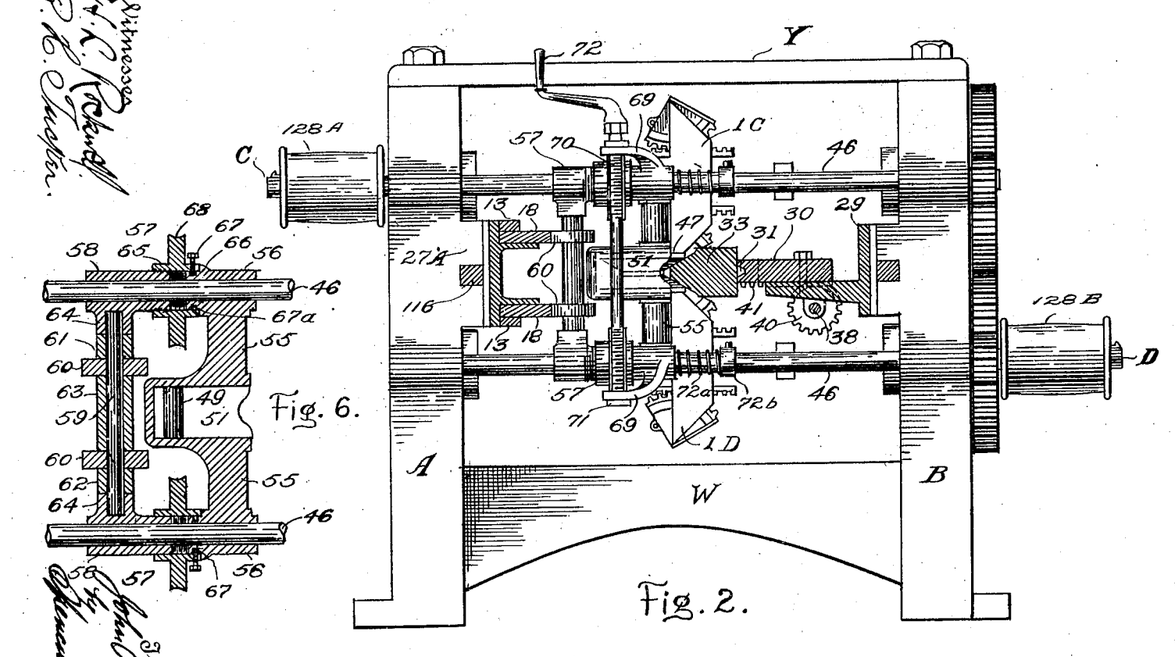
Fig. 2 is also a sectional elevation taken on line 2—2 of Fig. 3.
Fig. 6 is a front view in section of the front work holding and guiding means.

To the front and rear of the cutter shafts and as near to the cutter heads as good clearance will allow, are located shafts 46 parallel to shafts C and D (see Figs. 2 and 3) for carrying the work guiding and holding means. This consists of rollers 47 and 48 placed on roller bearings 49 and 50 in casings 51 and 52 to the front and rear of the cutters, respectively. By reference to Figs. 2ª and 6ª, it will be seen that the roller 47 has a circumferential ribbed V-shaped groove in its periphery adapted to hold the unfinished edge of the work, while the roller 48 is square-edged, and a spring-pressed guide 53 with a V-shaped groove 54, (the guide being pivotally mounted on extensions 55 from the top and bottom of the casing 52, and held in position by spring 55ª,) holds the work against vertical vibration as it emerges from the cutters in its finished condition. The casings 51 and 52 are centrally located between shafts 46 and upwardly and downwardly extending arms 55 connect to one end 56 of the two part sleeves 57, slidably mounted on the shafts. The other ends 58 are connected to each other by rods 59 carrying the rollers 60 adapted to bear on the patterns 18 and keep the rollers 47 and 48 firmly pressed against the side of the work. The rollers are spaced on the rod by collars 61, 62 and 63, the rods 59, fitting at their opposite ends into bosses 64, extending up or down as the case may be from the parts 58. The parts 56 and 58 of the sleeve 57 are joined by the outer sleeve 65, one end of this sleeve fitting over the end of the part 56 a short distance and abutting against an annular boss 66, being secured in place by bolts 67, whose ends project into a groove 67ª turned on the end of the part 56. The other end of this sleeve 65 is screw-threaded on the adjacent end of the sleeve 58 and provided with a gear 68.

Formed integrally with the parts 56 are projecting arms 69 carrying a rod 70 screw-threaded at its opposite ends, the threads being meshed with the worm-gear 68 and the rod extending between the upper and lower shafts 46, which shafts, it may be said, are in vertical alinement. Collars 71 on the rods 70, just outside the arms 69, secure it in position, and the upper ends of the rods are squared and provided with operating handles 72, springs 72ª against collars 72ᵇ holding the rollers on the patterns. As will be readily seen this mechanism consisting of rod 70, gear 68 and sleeve 65, is a ready means for adjusting the guides to any size of work and with any degree of pressure.

The mechanism shown in Fig. 6 is placed on the shafts 46 in front of the cutters, while the mechanism shown in Fig. 6ª is placed on the rear shafts 46, roller 47 being adapted to hold the unfinished side of the work and roller 48 and guide 52 to hold the finished side as it emerges from the cutters. As is seen in Fig. 3, spring-pressed guide 53, shown in Fig. 6ᵃ engages the work ahead of the roller 48, and immediately it leaves the knives.

Figure 4:
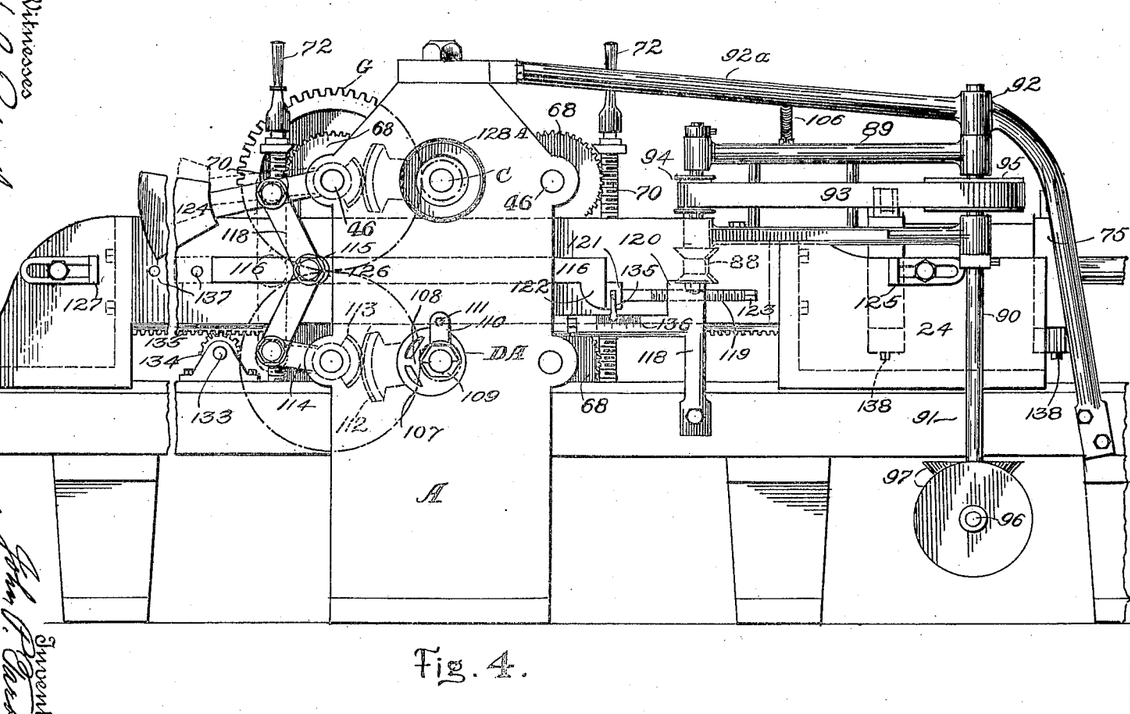
Fig. 4 is a longitudinal elevation.

Referring now to Figs. 3 and 4, the headstock 24 and the tail piece 25 only, have V-shaped grooves in their bottoms. They are adapted to slide on rails 73 on the base of the machine. The beams 23 and 29 connecting the head-stock and tail piece are some inches above the base, thus allowing ready access to the bottom of beam 23 for attaching and detaching patterns. The head stock 25 is provided with clamps 74 and 75 of the type shown in the application above referred to, for holding the oar by the handle. This insures accurate centering, the handle having been finished beforehand. At the top the upper jaws 74ᵃ and 75ᵃ are hinged at points 76. The construction of these clamps, however, forms no part of the present invention. They are revoluble through 180 degrees back and forth and are capable of being clamped in either extreme position. The means for accomplishing this in the present instance comprise a disk 78 connecting the clamps, with notches 79 and 80 in its periphery at such points as to be engaged by latch 81 in either extreme position. Latch 81 is a simple rectangular bar hinged in a slot 83 in one of the stocks and provided with a finger-ring 84 for lifting up. The stocks 85 and 86 carrying the clamps each have their top part removable and secured in place by bolts 87 so that the clamps may be easily put in and taken out.

Figures 7, 14:
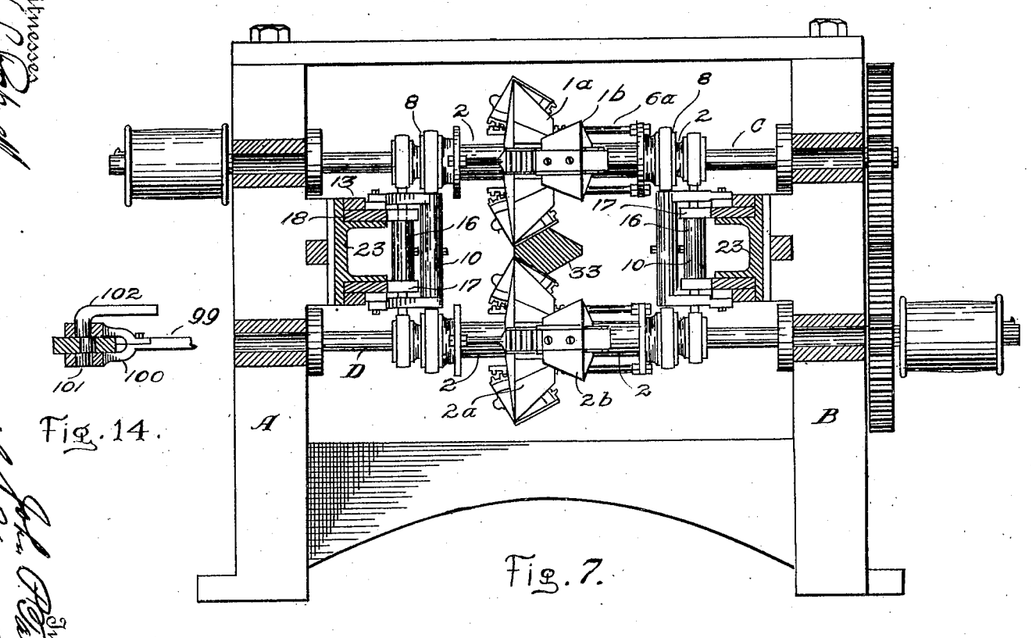
Fig. 7 is a sectional elevation of the modification taken on line 7—7 of Fig. 9 and looking in the direction of the arrow.
Fig. 14 is a detail of one of the guide rollers for the edge cutting knives.

Ahead of the front guide roller 47 is provided a cutter 88 for cutting the edge of the rough blank to the proper contour of blade desired and preparing it for reception by the guide roller 47 by sloping its sides to correspond to the V-shaped groove in the roller. This cutter 88 is carried at the end of a swinging frame 89 journaled on a vertical shaft 90, the shaft being carried in bearings 91 and 92 at the side of the machine, a frame piece 92ᵃ supporting the upper end bearing. A belt 93 passing over suitable pulleys 94 and 95, respectively, drives the cutter from shaft 90, this shaft being driven from a cross-shaft 96 in the base of the machine by beveled friction gears 97. The cutter 88, like the cutter heads, and the work guiding means, is controlled by pattern 18, a roller 98 being eccentrically mounted at the end of the triangular extension 99 from the frame 89. As shown in Fig. 14, the forked ends 100 of the triangular frame 99, support a short shaft 101 having an eccentric middle portion and provided with a handle 102 on its end. This handle is adapted to be engaged by stops 103 and 104 attached to the carriage at both extremes of its travel, and, as will be explained, serves to move the cutter 88 away from the work on the return motion of the carriage. The rear stop 104 is in the shape of a rod slidably secured to the top of the tail piece 25 and is provided with a set screw 105 for clamping it in place. A spring 106 secured at one end to the frame 89 and at the other to the frame of the machine serves to hold the roller 98 against the pattern 18.

It is desirable that the cutters be kept out of engagement with the work on the return movement. In the operation of the machine the oar blade is fed in to the cutters and then fed out again and in order to avoid back cut the cutters must not engage the work while it is being drawn out. I have described such means in connection with the edge cutter 88, and will now describe the means for controlling the main cutters 1ᶜ and 1ᴅ of the machine. This means I have combined with means for varying the thickness of the edge of the oar or the distance between cutters, the bearings CA, CD, DA, DB, respectively, carrying the shafts C and B are eccentrically placed in cylindrical shells 107. The shells have three webs 108 meeting at a common point, two adjacent webs being formed on one side to receive the two halves of the hexagonal journal 109, the opening between the side of the shell and the two webs being of like shape. Enough clearance is allowed on the upper side of the journal which is tapered to admit the ready removal of the upper half when it is desired to take the bearing apart, or the insertion of a cotter pin 110, which holds it firmly in place and serves as means of adjustment. A bolt 111 from the outer end of the cotter to the standard holds it in place. The inner ends of shells 107 have attached to them segmental gears 112 meshing with segmental gears 113 on the ends of levers 114 keyed to the shafts 46 which serve as fulcrums. The rear ends of these levers are linked by rods or bars 118 to points 115 on cross bars 116, slidably mounted in slots in the abutments 27ᴬ and 27ᴮ, (see Fig. 1) on the inner sides of the standards A and B, respectively. The wearing plates 28 secured to the abutments in any convenient manner hold the cross-bars 116 in place. At the front end of one cross bar, preferably that at the left hand side of the machine next to the standard A, is an L shaped frame 118 carrying an adjusting screw 119, threaded in an upwardly and inwardly extending projection 120, and provided with an abutting piece 121, which acts as a stop to the cross bar 116, the front end of the cross bar being provided with a boss 122 to meet it. The screw 119 is provided with a square end 123 for adjusting, and weights 124 on rearward extensions of upper levers 114 keep the system steady and the cross bar against the stop 121. Attached to one side of the head stock 24 is a dog 125, which engages the bar 116 at the completion of the forward movement of the carriage and moves it and the connected levers to a position shown in dotted lines at which position (the rods 118 being provided with shoulders 126 at their juncture with cross bar 116) form a toggle. This toggle is adapted to remain in the expanded position until the completion of the return movement of the carriage when a second adjustable dog 127, at the tail end of the carriage, strikes it and breaks it, the parts returning to the position shown. As is evident the expanding of this toggle moves the shafts C and D toward and from each other. The levers 114 of the system being geared to the shaft 46, stops and dogs on one side of the machine only are necessary. In order to secure cheaper construction, the larger of the gears G, connecting the shafts C and D on the opposite side of the machine, are mounted on the ends of the rear shafts 46, but as they are loosely mounted and not splined or keyed, they do not interfere with the operation of the system as described. Nor does the small movement necessary (1 inch at most) effect the operation of the work-holding means which is also sleeved on these cross-shafts.

In order to better balance the system just described, the pulleys $128^A$ and $128^B$ are placed on opposite sides of the machine, and the drive shaft $128^E$, (see Fig. 15) placed on a horizontal line midway between them.

$128^A$ and $128^D$ are the pulleys on the shafts C and D, respectively, which are belted to pulleys 129 on shaft $128^E$, on the horizontal line midway between the shafts C and B, and sufficient distance from them to give a good belt drive. A third pulley 131 on shaft $128^E$ may be used to drive by belt 132 a cross shaft 96, geared to the edge cutting knives. Power may be supplied from any suitable source to drive the cross shaft 133, (see Fig. 4), having pinions 134 meshing with racks 135, beneath the beams 23 and 29. Any of the well known forms of reversing mechanism may be used in this connection to carry the carriage forward and back again.

The operation of the machine is as follows: The carriage being at its extreme backward position with the cutters in the position shown, cross bar 116 being against stop 131, the patterns for the size of oar desired to be cut are bolted to the beam 123 at top and bottom, respectively. The patterns are identically alike on the top and bottom of the beam, the object of using two patterns being to secure good operation with simplicity of parts. This done, the stop 121 is adjusted by turning the screw 119 until the pointer 135, attached to the stop, indicates the proper thickness of edge for that size of oar on the scale 136 on one arm of the frame 118. This scale is laid off in fractions of an inch distance between the centers of the knife carrying segments. The centers of these segments being in one end of the knife in each case, the thickness of the edge of the oar is determined. The dog 127 is then set (by bolting in one of the holes 137 in the back of beam 23 or the tail piece,) to trip the toggle to which the cross bar 116 is connected, at the proper point for that size of oar, and about the time the motion of the carriage is intended to be reversed. The rod or stop 104 is also moved up to throw the eccentric arm 102 at the same time that the dog 127 trips the toggle. The dog 125 and stop 103 being at the head stock end of the carriage, the neck of the oar being always at the same point, ordinarily need no adjustment. A blank is now placed in clamps 74 and 75, the hinged-bars being thrown back for this purpose, and clamped firmly in place by turning the nuts 138 on the bottom of the clamps (see Fig. 4). These clamps have the universal feature and are self-centering. The steady rest is now moved up to the edge of the work and the work backed firmly against the rest by several blows of a mallet. The rest is clamped down by means of screws 42 and 45 and the carriage is ready to start forward. Assuming it started, the work first strikes knife 88 which trims the edge to the proper contour and prepares it to be held by the V-shaped groove in roller 47. As the work first reaches the roller, the roller is screwed hard down upon it by turning the front handle 72. Striking cutters $1^c$ and $1^d$, two opposite faces are cut, the roller 47 holding the work firmly against the steady rest 30, and preventing lateral movement or vertical vibration. As the work emerges from the cutters at the rear of the machine, it is caught in the V-shaped groove in the guide 43 and engaged by the roller 48, which, like the roller 47, is adjusted to the work by turning handle 72 corresponding. It will be observed that the thrust from the steady rest is at all times taken up against the stand B, while the thrust from the patterns is correspondingly taken up against standard A. The two standards being rigidly connected together, all thrust is balanced and the jar and vibration thus reduced to a minimum. As the head stock nears the knife 88, the latter is moved away from the work and out of the path of the head stock, the roller 98 following the sidewise extension $98^a$ of the pattern 18. The head stock can thus move right up to the rollers 47, thereby enabling the work to be gripped well up in the neck and more firmly held. The neck of the oar having reached the cutters, the dog 125 and stop 104, strike the cross bar 116 and arm 102, respectively. It is then intended that the carriage be reversed. As it runs back, all the cutters are clear of the work and the stops 127 and 104 come into play at the end of the return motion to return the cutters to normal position. The blade is then turned through 180 degrees and clamped in position, the steady-rest of course having been run back. The rest is now moved up again, the V-shaped groove 31 engaging the finished edge of the work, and clamped in position as before. Abutments 34 in the slots in the edge of the rest are moved forward to meet the edge of the work and jammed in position by the nut 37. The remaining two faces of the oar are then cut as were the first. The use of the abutment 34 in the steady-rest gives the firm backing required, while the V-shaped groove 31 takes the place of the pins 32 in preventing vertical vibration. The carriage having run back, the steady rest is moved away from the work, the work removed and another piece inserted. It will be noted at once that none of the adjustments described have to be again made or even changed once the machine is "set up" for certain size oar, all that is necessary is to place the work in the machine, cut one side, turn it, cut the other, and then remove it, inserting another blank thereafter.

As has already been said this construction lends itself readily to the building of a machine in which an oar blade may be completed in a single operation, thus halving the time and doubling the out-put. This modification will now be described.

Figures 6A, 6B, 12, 13:
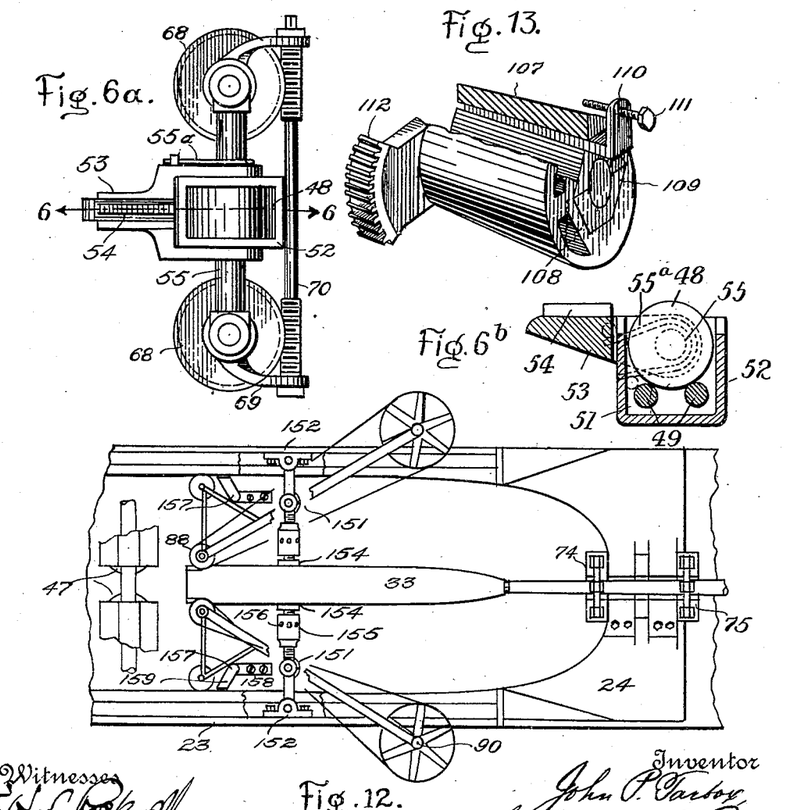
Fig. 12 is a plan view on a reduced scale showing means for holding the work preliminary to its reaching the main guide rollers.
Fig. 13 is a perspective sectional view of one of the main bearings and its shell.
Figures 8, 15:
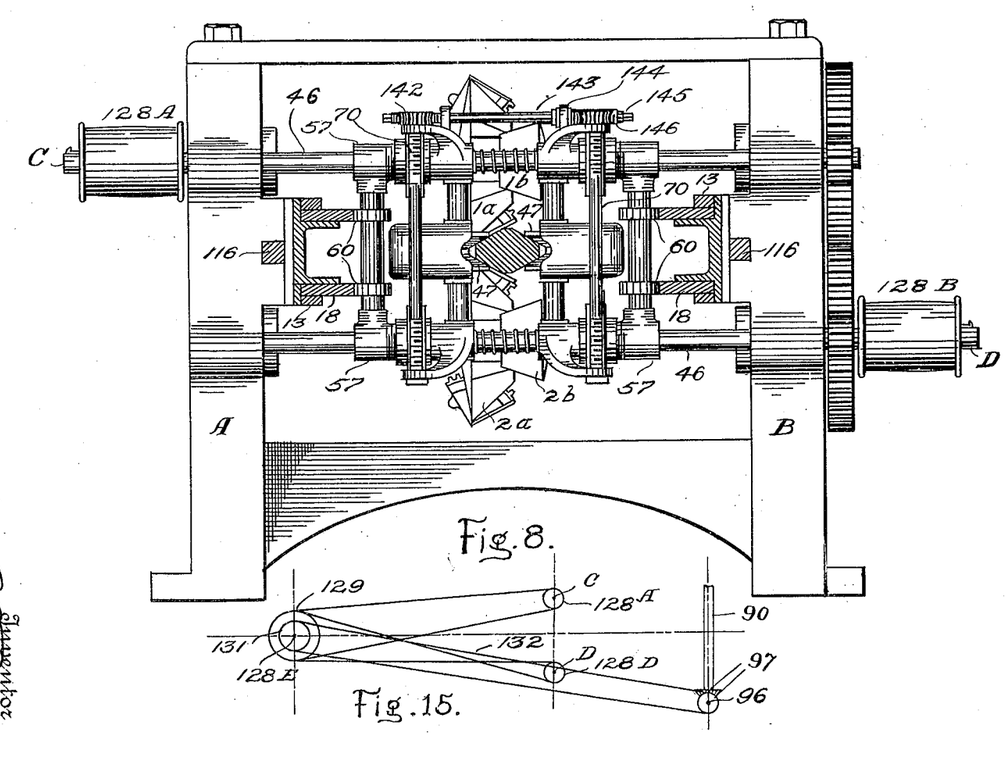
Fig. 8 is a similar view taken on line 8—8, of Fig. 9.
Fig. 15 is a diagrammatical view showing the arrangement of the belting for driving the cutter shaft.
Figure 9:
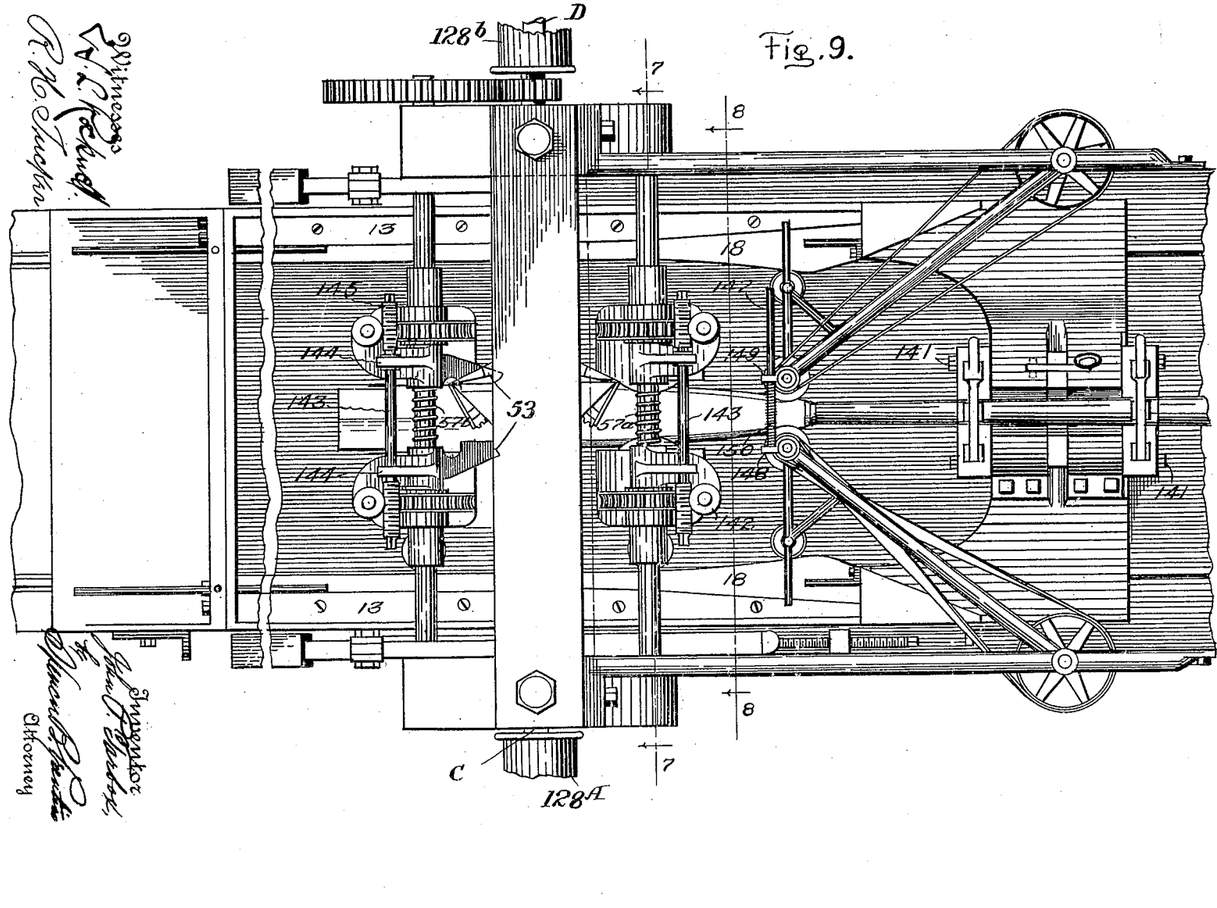
Fig. 9 is a plan view of the modification.
Figure 10:
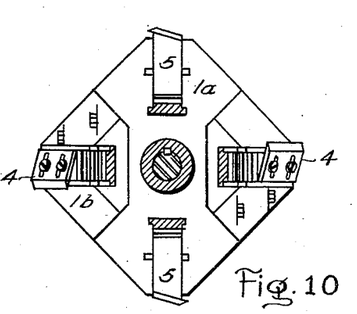
Fig. 10 is an end elevation of a pair of the intermeshing cutter heads used in this construction.
Figure 11:
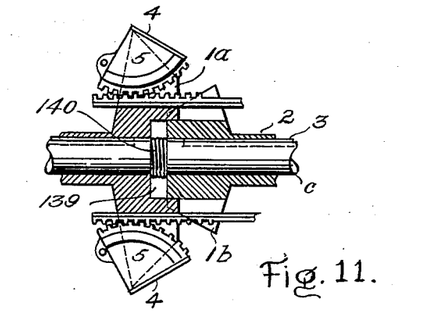
Fig. 11 is a vertical section of the same.

Referring now to Figs. 7, 8 and 9, all corresponding main parts bear the numbers already used. The steady rest 30 and beam 29 on the right of the machine have been done away with, and the whole machine has been made symmetrical by the use of the intermeshing cutter heads shown in Figs. 10 and 11; and the cutter head and knife shifting mechanism and the front and rear work guiding and holding means, the beam 23 carrying patterns, and the cutter 88, having been duplicated on the right-hand side B of the machine. Excepting the intermeshing cutters, these parts need no description. Referring to Figs. 10 and 11, these heads are each formed in effect of two enlarged portions carrying knives on opposite sides of the shaft and connected by a narrower central bar or body forming the hub; one head being set at right angles to the other on the shaft and the enlarged portions of one head fitting between the enlarged portions of the other head and the shank portions being "halved" or reduced axially of the shaft to permit the heads to fit closely into each other. We have then a head carrying two cutters and much in the shape of a figure 8. The side away from the sleeve 2 is then hollowed out as at 139, a sufficient depth to permit another head of like shape and oppositely disposed on the shaft to mesh with it. The cutters are designated $1^a$ and $1^b$ and the shaft $c$. $2^a$ and $2^b$ are the corresponding cutters on the shaft D. A spring 140 is placed between the heads tending to force them apart against the action of the respective patterns 13. Instead of using springs $9^a$ to hold the sleeves 9 against the centrifugal action of the knife bearing segments, the sleeves 8 on the left-hand side of the machine are connected to the racks moving segments in the cutter heads on the right hand side of the machine and vice versa. This throws the centrifugal force exerted by the unbalanced weight of the segments as they move to and fro about their centers on the patterns, and springs are not necessary. Of course, in this construction, patterns 13 are turned end-for-end. The remaining difference between this machine and the one first described exists in the following:— The clamps, instead of being revoluble, are fixed to the stocks by bolts 141. Rods 70 have at their upper ends worm-gears 142, meshing with screw threads on the ends of the horizontal rod 143, carried in vertical bearing projections 144, from the ends 56 of the sleeves 57. One end 145 of the rod 143 has splined on it a threaded sleeve 146 which meshes with the corresponding gear 142. This admits the horizontal movements of the work guiding means in following the patterns 23, while both front and back means have the universal feature of adjustment as supplied by these rods which have their ends squared for the use of a wrench in turning. Instead of the spring 106 from the frame 99 to the machine frame, to hold the rollers 98 to the patterns 23, a rod 147 fixed to one frame 89 at point 148, and running through a hole in projection 149 on the other frame 89, and supporting a spring 150 between the projections, is used. Springs $57^a$ and $57^b$ between the sleeves 57 and the cutter heads, respectively, serve to keep the followers on the patterns in these cases. Work holding means in the shape of toggles 151, hinged to block 152, secured to the inner sides of beams 23, are introduced for the purpose of steadying the work prior to its engagement with the rollers 47, and during the cutting of the edge by the cutters 88 (see Fig. 12). One branch of this toggle carries on its end a head piece 154. This branch is made in two parts connected by collar 155 having a circumferential row of holes 156, adapted to receive a spanner wrench and permit the adjustment of a head 154 to the work. Suitable stops 157 are provided on the base of the machine, being secured thereto by screws 158 for breaking the toggle before it reaches the cutters 88, arms 159 from the upper end of these stops serving to throw the toggles back against the inside of beams 23 and thus enable the carriage to move freely past the cutter mechanism. In all other respects the parts of the machine are identically the same as those used in the first machine described.

The same floating system between cutters is used and the same gearing G is provided between shafts to insure the knives above and below the work striking at the same instant. The cutters 88 revolve in opposite directions (this arrangement is secured easily by crossing a belt 93 as shown) thus cutting against each other.

The operation is evident. Work being put in place and other adjustments having been made, the carriage is run forward carrying the work past and between the cutters, all four faces, comprising the whole surface of the blade being shaped at once. Upon the completion of the cut, the carriage is run back and other work is inserted. As is also evident, all thrusts are taken up in the same manner as in the previous form of the invention. All necessary adjustments are likewise made in the same manner. The use of the rods 143 connecting the work guiding and holding means on opposite sides of the machine somewhat simplifies this adjustment.

These machines like the one forming the subject of my co-pending application, are of very ready adjustment for all sizes of oar. Any and all sizes of oar may be cut by the insertion of suitable patterns. Likewise those of any size, weight, or spring may be cut by further change of pattern. Work of the best grade is turned out, all surfaces being absolutely smooth and the blade being absolutely symmetrical with respect to the handle.

I am aware that use has been heretofore made of cutter heads splined on the driving shaft and moved by patterns operating on collars connected thereto through suitable mechanism, but I do not know of any machine embodying my arrangement of cutters on upper and lower shafts and the connection between the mechanism operating the respective cutters, nor do I know of any arrangement in which the parts as a whole are arranged to have all thrusts taken up in a solid rectangular frame.

My invention may obviously take many other forms (I have shown only the best construction known to me at the present time) and I do not, therefore, wish to be understood as limiting it further than is done in the appended claims.

Having described my invention, what I claim as new and desire to secure by United States Letters Patent is:—

1. In a machine of the character described, a base, a frame-work rising from the base and carrying revolving shafts, pattern controlled cutter heads carried by said frame and carrying in turn pattern controlled knives, and patterns for said knives and heads so supported that all thrust on them is taken up by said frame.

2. In a machine of the character described, a base, standards rising from the base and carrying revolving shafts, pattern controlled cutter heads mounted on said shafts and carrying pattern controlled knives, and patterns supported against the thrust of said cutter heads and knives by said standards.

3. In a machine of the character described, a base, standards rising from the base and carrying oppositely revolving shafts, pattern controlled cutter heads mounted on said shafts and carrying pattern controlled knives revolubly journaled therein, and a reciprocating carriage on the base, having the patterns for controlling the heads and the knives so mounted thereon that all thrust on the patterns is taken up against the standards.

4. In a machine of the character described, a base, standards rising from the base and carrying revolving shafts, pattern controlled coöperating cutter heads mounted on said shafts and carrying pattern controlled knives, a reciprocating work carrying carriage comprising a head piece and a tail piece interconnected by channel beams, and patterns on the beams, the beams being so disposed that all thrust on the patterns is taken up against the standards.

5. In a machine of the character described, a base, standards rising from the base and carrying revolving shafts, a web connecting the bottoms of the standards and a yoke connecting their tops, pattern controlled heads on the shafts and carrying pattern controlled knives for operating upon the work, and patterns supported against the thrust of said cutters and knives by said standards.

6. In a machine of the character described, a base, standards rising from the base and supporting two revolving cutter shafts, a web connecting the bottoms of the standards and a rigid yoke connecting their tops, the whole forming a rigid rectangular frame, a reciprocating work-carrying carriage mounted on the base, pattern controlled cutters splined on the shafts, and patterns mounted on said carriage and supported against the thrust of said cutter heads by said standards.

7. In a machine of the character described, a base, standards rising from the base, and supporting two revolving cutter shafts, a web connecting the bottoms of the standards and a rigid yoke connecting their tops, the whole forming a rigid rectangular frame, two oppositely disposed pattern controlled cutters mounted on each shaft, a reciprocating work carrying carriage mounted on the base, and patterns for moving said cutters mounted on said carriage and supported against the thrust of the cutters by said standards.

8. In a machine of the character described, a base, standards rising from the base and carrying revolving shafts, cutters on the shafts, a reciprocating work carrying carriage, and a steady-rest so supported on said carriage that the thrust on said rest is taken up by said standards.

9. In a machine of the character described, a base, standards rising from the base and supporting two oppositely revolving cutter shafts, a web connecting the bottoms of the standards and a rigid yoke connecting their tops, the whole forming a rigid rectangular frame, pattern controlled cutters mounted on the shafts for engaging the work, a reciprocating work carrying carriage, a steady rest for the work, and patterns for said cutters, the steady rest and the patterns being so disposed on said carriage that all thrust on them is taken up within said frame.

10. In a machine of the character described, a base, standards rising from the base and carrying revolving shafts, cutters on the shafts, a reciprocating work-carrying carriage, pattern controlled work-guiding and holding means past which the work is carried and patterns supported against the thrust of said means by said standards.

11. In a machine of the character described, a base, standards rising from the base and supporting two revolving shafts, a longitudinally reciprocating work carrying carriage mounted on said base, pattern controlled cutter heads splined on said shafts and carrying pattern controlled knives, work guiding and holding means both to the front and to the rear of the cutters also controlled by pattern, and controlling patterns mounted on said carriage and supported against the thrust of said pattern controlled elements by said standards.

12. In a machine of the character described, a base, standards rising from the base and supporting revolving cutter shafts, a longitudinally reciprocating work carrying carriage comprising a headstock and a tail-piece interconnected by beams, the said beams being so disposed that they slide in contact with said standards, cutters for engaging the work, and patterns for guiding the cutters supported on said beams.

13. In a machine of the character described, a base, standards rising from the base, and supporting two revolving cutter shafts, a longitudinally reciprocating work carrying carriage comprising a headstock and a tail-piece interconnected by flanged channel beams, inwardly projecting bosses formed on the inner sides of the respective standards between the cutter shafts, the beams being so disposed that the bottoms of the channels slide in contact with said bosses, pattern controlled cutters for engaging the work, and patterns supported on said channel beams with their edges backing against said flanges.

14. In a machine of the character described, a base, standards rising from the base and supporting two revolving cutter shafts, a longitudinally reciprocating work carrying carriage comprising a headstock and a tail-piece interconnected by channel beams, inwardly projecting bosses formed on the inner sides of the respective standards, the beams being so disposed that the bottoms of the channels slide in contact with said bosses, cutters on the shafts, patterns for guiding the cutter supported on said channel beams, and wearing plates between the said beams and the said bosses.

15. In a machine of the character described, a framework supported by the base and carrying two cutter shafts one above the other, a longitudinally reciprocating work carrying carriage, cutters mounted on the shafts, pairs of other shafts to the front and rear of the first mentioned shafts respectively, adjustable work guiding and holding means and supports therefor connecting said pairs of shafts.

16. In a machine of the character described, a base, a framework rising from the base, and carrying a pair of revolving shafts, a pair of coöperating cutters mounted on said shafts for engaging opposite sides of the work, two other sets of shafts in plane parallel to the plane of the first mentioned set, work guiding and holding means and supports therefor connected to pairs of the last mentioned sets of shafts.

17. In a machine of the character described, a base, a framework rising from the base and carrying a pair of revolving shafts, a pair of coöperating cutters mounted on the shafts for engaging opposite sides of the work simultaneously, two other sets of shafts parallel to the first mentioned shafts, work guiding and holding means carried by said last mentioned sets of shafts, patterns for controlling said means, said means comprising a roller supported by two part relatively adjustable sleeves on the shafts, and followers connected to said sleeves.

18. In a machine of the character described, a reciprocating carriage, coöperating cutters for engaging the work, and independently movable pattern controlled work guiding and holding means past which the work is carried by the carriage.

19. In a machine of the character described, a reciprocating work carrying carriage, coöperating cutters for engaging work, and pattern controlled work guiding and holding means past which the work is carried by the carriage provided with means for adjusting the same to and from the work.

20. In a machine of the character described, a reciprocating work-carrying carriage, coöperating cutters for engaging work, and work guiding and holding means, comprising members slidable on parallel bars and formed in two parts, a member engaging the work carried by the first of said two parts, a follower carried by the second of said parts, means for moving the parts of said slidable members relatively to each other, and means controlling their movement toward and from the work.

21. In a machine of the character described, a reciprocating carriage, coöperating cutters for engaging work, and work guiding and holding means comprising two parallel shafts, two part sleeves mounted on each of said shafts, the one of said parts being rigidly connected with a casing carrying a guide roller, a rigid rod carrying rollers adapted to follow patterns connected to the other of said parts, a reduced portion on each of the first of said parts provided with a peripheral groove, the unreduced portion forming a shoulder with the reduced part, screw threads on the adjacent portions of the other parts, and a connecting collar rotarily locked to the ends of the first of said parts, and screw threaded to the ends of the second of said parts.

22. In a machine of the character described, a reciprocating carriage, coöperating cutters for engaging work, and work guiding and holding means comprising two shafts both to the front and to the rear of the cutter shafts, two part sleeves on said shafts, the first of said parts being connected to a casing carrying a guide roller between the shafts, the second of said parts being interconnected by a rigid rod extending between the upper and lower shafts respectively and carrying rollers engaging said patterns, and collars connecting the two parts of said sleeves, said collars being swiveled to the one part and screw threaded to the other part, and gearing between the collars on the upper and lower shafts.

23. In a machine of the character described, a reciprocating carriage, coöperating cutters for engaging the work, and work guiding and holding means, consisting of a roller mounted in a casing on roller bearings, upward and downward projections extending from said casing and connected in each case to one part of a two part sleeve slidably mounted on a transverse shaft, a rod carrying followers spaced apart by collars connecting the other parts of said sleeves, an adjusting collar connecting the two parts of each sleeve to each other, said collar being swiveled to one of said parts and screw threaded to the other, and gearing between the collars.

24. In a machine of the character described, a base, a reciprocating work carrying carriage, standards rising from the base and carrying coöperating cutters, work guiding and holding means on each side of the work both to the front and to the rear of the cutters, patterns for pressing said means to the sides of the work, and gearing between the said means on opposite sides of the work for adjusting the said means to and from the work simultaneously.

25. In a machine of the character described, a reciprocating carriage, coöperating cutters for engaging work, a roller with a V-shaped groove on one side of the cutters for engaging the unfinished work, and a smooth faced member coöperating with a yieldingly mounted grooved member at the other side of the cutters for engaging the finished edge of the work.

26. In a machine for forming the blades of oars, a reciprocating carriage, coöperating cutters for engaging the work, means on one side of the cutters for holding and guiding the unfinished work, means on the other side of said cutters for holding and guiding the finished work differing from the first named means in the degree of pressure and the engagement with the work, and interchangeable supports for said holding and guiding means.

27. In a machine of the character described, a reciprocating carriage, coöperating cutters for engaging the work, a roller with a ribbed V-shaped groove on one side of the cutters for engaging the unfinished work, a cylindrical roller coöperating with a yieldingly mounted grooved member on the other side of the cutters for engaging the finished edge of the work, and interchangeable means for supporting said members.

28. In a machine of the character described, a reciprocating carriage, coöperating cutters for engaging the work, a roller with a ribbed V-shaped groove on one side of the cutters for engaging the unfinished work, a cylindrical roller coöperating with a concentrically pivoted grooved member on the other side of the cutters for engaging the finished work, and interchangeable pattern controlled means for supporting said members and rollers.

29. In a machine of the character described, a reciprocating carriage, coöperating cutters for engaging the work, and work guiding and holding means, said means consisting of a roller in front of the cutters arranged to prevent both vertical and horizontal movement of the work, and a smooth faced member in the rear of the cutters for preventing horizontal movement and associated with a grooved member engaging the finished work directly it leaves the cutters to prevent vertical movement of the work.

30. In a machine of the character described, a base, a reciprocating work carrying carriage, standards rising from the base and carrying a pair of revolving cutter shafts eccentrically mounted in cylindrical journals, cutters for engaging the work mounted on said shafts, and means connecting said journals and actuated by the movement of the said reciprocating carriage to move the cutters away from the work at the completion of a cut.

31. In a machine of the character described, a reciprocating work carrying carriage, standards rising from the base and carrying a pair of revolving cutter shafts eccentrically mounted in cylindrical shells journaled in the standards, cutters for engaging the work mounted on said shafts, and a connection between the shells for moving the cutters away from the work at the completion of their cut.

32. In a machine of the character described, a base, a reciprocating carriage mounted on the base, standards rising from the base on the right and left of the machine, cutter shafts carrying cutters for engaging work eccentrically journaled in said standards, and gearing between the journals, said gearing forming with the shafts and the cutters a counterbalanced system, the weight on one side of the system balancing the weight on the other, and means for automatically controlling said system to separate the cutters.

33. In a machine of the character described, a base, a reciprocating work carrying carriage mounted on the base, standards rising from the base on the right and left of the machine, cutter shafts carrying cutters for engaging the work eccentrically mounted in said standards, gearing between the mountings, said gearing forming with the shafts and cutters a counterbalanced system, the weight of one side of said system balancing the weight of the other, means for keeping the system normally stationary and means for automatically controlling said system to separate the cutters.

34. In a machine of the character described, a base, a reciprocating work carrying carriage mounted on the base, standards rising from the base on the right and left of the machine, cutter shafts carrying cutters for engaging the work eccentrically journaled in said standards, other shafts mounted to one side of the first mentioned shafts, gears on said journals meshing with gears mounted on the last mentioned shafts, and a link connection between said last named gears.

35. In a machine of the character described, a base, a reciprocating work carrying carriage mounted on the base, standards rising from the base on the right and left of the machine, cutter shafts carrying cutters for engaging the work eccentrically journaled in said standards, other shafts mounted to the front and rear of the first mentioned shafts and carrying means for guiding and holding the work, gears on said journals meshing with gears mounted on the shafts to the rear of the first mentioned shafts, slots between said first mentioned shafts on the sides of the standards, cross bars in said slots, connecting links between said bars and the corresponding gears on the rear shafts, an abutment mounted on the frame of the machine against which said cross bar is adapted to rest, and means for keeping the system normally stationary.

36. In a machine of the character described, a base, a reciprocating carriage mounted on the base, standards rising from the base on the right and left of the machine, cutter shafts carrying cutters for engaging work eccentrically journaled in said standards, and gearing between the journals, said gearing forming with the shafts and cutters a counterbalanced system, the weight on one side of said system balancing the weight on the other, means for keeping the system normally stationary, means for adjusting the distance between the cutters and means for automatically controlling said system to separate the cutters.

37. In a machine of the character described, two oppositely revolving shafts so mounted and connected as to form a counterbalanced system, the weight of one of said shafts balancing the weight of the other, and common means for adjustably determining the range of movement of each shaft toward the other.

38. In a machine of the character described, a base, standards rising from the base, coöperating cutter shafts mounted therein and carrying cutters, eccentric mountings for said shafts, connections between said mountings, an abutment on the frame for limiting the approach of each of the cutters toward the other, and means for maintaining the cutters in the limiting position.

39. In a machine of the character described, a base, a reciprocating work-carrying carriage, a pair of revolving shafts in the same vertical plane, pattern controlled cutters mounted on each shaft, work-guiding and holding means, and a common pattern surface for controlling said cutters and said work guiding and holding means.

40. In a machine of the character described, a base, a reciprocating work carrying carriage, a pair of revolving shafts in the same vertical plane, pattern controlled cutters mounted on each shaft, cutters on shafts at an angle to the first mentioned shafts, work guiding and holding means, and a common pattern surface for controlling all of said cutters and said work guiding and holding means.

41. In a machine of the character described, a pair of revolving cutter shafts placed one above the other, cutter heads slidably splined on said shafts and provided with elongated hubs, a common connection between the cutter heads on the upper and lower shafts, knives mounted on segmental blocks in said heads and connected to sleeves slidably mounted on said hubs, a common connection between the sleeves, patterns for controlling the heads and the knives, and followers on said connections adapted to follow said patterns.

42. In a machine of the character described, a pair of revolving shafts carrying movable cutter heads, knives movable on said cutter heads for engaging the work, connections between corresponding knives and between corresponding cutter heads, and common patterns for said corresponding knives and corresponding cutter heads, respectively.

43. In a machine of the character described, a pair of revolving shafts carrying movable cutter heads, knives on said cutter heads for engaging the work, connections between corresponding knives and corresponding cutter heads, common patterns for said corresponding knives and heads, and followers on said connections adapted to be moved by said patterns.

44. In a machine of the character described, a pair of revolving shafts carrying movable cutter heads, said shafts being capable of movement toward and from each other, knives movable on said cutter heads for engaging the work, expansible connections between corresponding knives and corresponding cutter heads, patterns for moving said heads and knives, and followers on said connections.

45. In a machine of the character described, a reciprocating carriage, a pair of parallel revolving shafts carrying movable cutter heads, knives movable on said cutter heads for engaging the work, expansible connections between corresponding knives and between corresponding cutter heads, patterns for moving said corresponding knives and corresponding cutter heads respectively, and means for adjusting the distance between the shafts.

46. In a machine of the character described, a reciprocating work carrying carriage, a pair of revolving shafts, coöperating cutters on the shafts for operating upon opposite sides of the work simultaneously, other shafts to one side of the first named shafts, work guiding and holding means mounted on these shafts, and gearing between the cutter shafts comprising pinions on each cutter shaft and one or more idlers, the idlers of said gears being mounted on the ends of said other shafts.

47. In a machine of the character described, a reciprocating work carrying carriage, a pair of revolving cutter shafts, cutter heads slidably mounted on said shafts, knives pivotally mounted in the heads, connections between the corresponding heads and knives on the two shafts, patterns for moving the said heads and knives, and a gearing connection between the two shafts, the arrangement being such that the heads and knives move back and forth on the shafts in unison and revolve in synchronism.

48. A shaping machine comprising in combination, a shaft and a cutter head thereon, and knives mounted pivotally on said head subject to centrifugal force, and a pattern controlling the effect of such centrifugal force and determining the penetration of the knives.

49. In a machine for forming the blades of oars, a reciprocating work carrying carriage, a pair of revolving shafts, cutter heads splined thereon, knives mounted in the cutter heads and revoluble about a point in the knife edge as a center, a cutter for cutting the edge of the oar, and means for moving said cutter to give said edge the proper contour and to move said cutter heads so that the centers of revolution of the knives will always follow the contour of the edge of the oar.

50. In a machine of the character described, a reciprocating carriage, a pair of revolving shafts, cutter heads splined thereon, knives mounted in the cutter heads and revoluble about a point in the knife edge as a center, a cutter for cutting the edge of the work, means for moving said cutter to give said edge the proper contour and for moving the knives and the heads so that the planes in which the centers of revolution of the knives lie will always be in coincidence.

51. In a machine for forming the blades of oars, a reciprocating carriage, a pair of revolving shafts, cutter heads splined thereon, knives mounted in the heads and revoluble about a point in the knife edge as a center, a cutter for cutting the edge of the oar, means for moving said cutter to give said edge the proper contour, and for moving the heads so that the edge of the oar will be of uniform thickness, and means for varying the angle of cut of the knives to form the backbone of the oar.

52. In a machine of the character described, a reciprocating work carrying carriage, a pair of revolving shafts, cutter heads splined thereon, pattern controlled knives in each of the cutter heads, and common patterns for controlling the corresponding heads and the corresponding knives by common patterns.

53. In a machine of the character described, a reciprocating carriage, a pair of revolving shafts, a pair of oppositely disposed cutter heads slidable longitudinally on each shaft adapted to be controlled by pattern, pattern controlled knives mounted in said heads, and patterns carried by said reciprocating carriage for controlling both the knives and the heads.

54. In a machine of the character described, a pair of coöperating pattern control cutters for engaging the work, a pair of channel beams spaced apart and with their flanges extending longitudinally of the machine, and patterns carried by the beams and mounted upon the flanges.

55. In a machine of the character described, a pair of coöperating pattern control cutters for engaging the work, a pair of channel beams spaced apart, and work-guiding and holding means movable into a position longitudinally of said channels or into a position at right angles thereto.

56. In a machine of the character described, two pairs of cutters for engaging the top and bottom sides of the work respectively, cutters for engaging the vertical edges of the work, a single pattern for controlling one pair of opposing cutters in engagement with one half of the oar blade and one edge cutter, and another pattern of like shape for controlling the other pair of opposing cutters and the other edge cutter.

57. In a machine of the character described, cutters for engaging the top and bottom sides of the work, cutters for engaging the edges of the work, work guiding and holding means on each side of the work past which the work is carried, and a single pattern on each side of the work for controlling the cutters and the work guiding and holding means on that side.

58. In a machine of the character described, the combination of a reciprocating work carrying carriage, with coöperating cutters for engaging one part of the work, work guiding and holding means past which the work is carried, and coöperating cutters for engaging another part of the work, the elements engaging the work in the order named, and means for clamping the work during its engagement with said first mentioned cutters and prior to its engagement by said work guiding and holding means.

59. In a machine of the character described, the combination of a reciprocating work carrying carriage, with coöperating cutters for operating upon one part of the work, work guiding and holding means past which the work is carried, coöperating cutters for operating upon another part of the work, the elements engaging the work in the order named, means for clamping the work during its engagement with said first named cutters and prior to its engagement with said work guiding and holding means, and means for releasing said clamping means upon the engagement of said work guiding and holding means.

60. In a machine of the character described, a frame-work supporting a pair of shafts, coöperating cutters on the shafts, a reciprocating work-carrying carriage passing through the frame and between the shafts, and connections between the cutters which pass through the carriage.

61. In a machine of the character described, a frame-work supporting a pair of shafts, coöperating cutters on the shafts, a reciprocating work carrying carriage passing through the frame and between the shafts, connections between the cutters which pass through the carriage, and work guiding and holding means also passing through the carriage and supported on opposite sides thereof.

62. In a machine of the character described, a pair of shafts spaced apart, coöperating cutters on the shafts, a reciprocating work-carrying carriage between the shafts and comprising a head-piece and a tail-piece interconnected by beams spaced apart, and connections between the cutters which pass between the beams.

63. In a machine of the character described, a pair of shafts spaced apart, coöperating cutters on the shafts, a reciprocating work-carrying carriage between the shafts and comprising a head-piece and a tail-piece interconnected by beams spaced apart, connections between the cutters which pass between the beams, patterns mounted on said carriage, and followers on said connections for engaging said patterns.

In testimony whereof I affix my signature, in presence of two witnesses.

JOHN P. TARBOX.

Witnesses:
H. L. ROCKWELL,
W. M. FAIRFAX.